July 21, 1942.  E. H. VEDDER  2,290,657

DISCHARGE APPARATUS

Filed Aug. 17, 1938  2 Sheets-Sheet 1

WITNESSES:
Leo W. Farman
Hyman Diamond

INVENTOR
Edwin H. Vedder.
BY
F. W. Lyle.
ATTORNEY

July 21, 1942. E. H. VEDDER 2,290,657
DISCHARGE APPARATUS
Filed Aug. 17, 1938 2 Sheets-Sheet 2

WITNESSES:
Leon M. Garman
Hymen Diamond

INVENTOR
Edwin H. Vedder.
BY
F. W. Lyle.
ATTORNEY

Patented July 21, 1942

2,290,657

UNITED STATES PATENT OFFICE 2,290,657

DISCHARGE APPARATUS

Edwin H. Vedder, Forest Hills, Pa., assignor to Westinghouse Electric & Manufacturing Company, East Pittsburgh, Pa., a corporation of Pennsylvania Application August 17, 1938, Serial No. 225,368

5 Claims. (Cl. 250—27)

My invention relates to electric discharge apparatus and has particular relation to discharge apparatus for controlling the supply of current to a load requiring power in intermittent pulses such as a resistance spot and seam welding load, for example.

The present invention relates to an application Serial No. 214,160, filed June 16, 1938, to me and Russell W. Staggs, and assigned to the Westinghouse Electric & Manufacturing Company, and is an extension of the invention disclosed therein.

In the above-mentioned application, apparatus is disclosed that incorporates electric discharge valves of the immersed-ignition-electrode type through which current is generally supplied from an alternating current source to a load requiring power in intermittent pulses. By the proper selection of the ignition electrodes of the discharge valves, and by the proper adjustment of the circuit in which they are connected, the load current variations are maintained within limits as regards both the current-time product and the magnitude of the individual sub-impulses which form a main impulse.

As is explained in the aforesaid application, the load supplied in the practice of the invention disclosed often has a poor power factor and the supply of the pulses is initiated at random. The magnitude of the variations produced is dependent on the relationship between the angle in the half-cycles of the source at which the valves are rendered conductive and the angle at which current zero occurs. The former I shall designate herein as the ignition angle; the latter as the power factor angle.

In accordance with the invention disclosed in the aforesaid application, variations in the current-time product and the magnitudes of the sub-impulses are limited by so selecting the ignition electrodes and their circuits that the ignition angle is of the same order of magnitude as the power factor angle. However, no simple means is made available in accordance with the said invention for adjusting the ignition angle with any degree of precision at a definite value and no simple contrivance for varying the current flow through the load over a wide range is provided.

It is accordingly an object of the present invention to provide an arrangement of simple structure in accordance with the aforesaid application, in which the ignition angle shall be adjustable at will.

A more general object of my invention is to provide a control system incorporating an electric discharge valve of the immersed ignition electrode type, in which the instant at which the valve is rendered conductive shall be adjustable at will by the proper adjustment of the ignition circuit.

Another general object of my invention is to provide an arrangement of simple structure for supplying a load from an alternating source wherein the supply of power shall be initiated at instants in the half periods of the source which may be selected at will.

Still another general object of my invention is to provide apparatus for supplying a load from an alternating current source through electric discharge valve means of the immersed ignition electrode type, in which the impedance of the ignition circuit shall be varied at will to vary at will the instants in the half periods of the source at which the valve means is rendered conductive.

A more specific object of my invention is to provide a resistance spot and seam welding system of simple structure incorporating the feature of heat control.

Another specific object of my invention is to provide an electric discharge valve of the immersed ignition electrode type, the ignition angle of which is variable to vary the magnitude of the current flow therethrough.

A further specific object of my invention is to provide a control system for an electric discharge valve of the immersed ignition electrode type wherein the ignition circuit shall be supplied with a potential variable in phase relative to the source potential.

A still further object of my invention is to provide an electric discharge valve of the immersed ignition electrode type that shall be particularly adaptable for use in apparatus in which the ignition electrode is to be supplied continuously or for relatively long intervals of time with current when the valve is in operation.

More concisely stated, it is an object of my invention to provide simple and tractable apparatus for supplying current to a load requiring power in intermittent pulses, by the operation of which the magnitude of the pulses supplied shall be variable over a wide range.

According to my invention, the ignition potential for the electric discharge valves is derived from the same source as the anode-cathode potential. However, in the ignition circuit impedance means, such as voltage dividers, variable reactors or other induction regulators are interposed to properly set the ignition potential supplied to attain the desired ignition characteristics. In accordance with a further aspect of my invention, the potential required for ignition and, therefore, the angle in the periods of the source at which ignition takes place is varied by providing the valves with a plurality of different ignition electrodes, one or the other of which is selected to attain the desired ignition characteristics. In accordance with a still further aspect of my invention, the impedance through the ignition electrode and the cathode in which it is immersed is varied to vary the potential required for ignition.

Finally, I provide an arrangement incorporating a phase shifting element for varying the instants in the half periods of the source at which the valves are rendered conductive over the whole range extending from the power factor angle to the point of zero potential. Since the proper operation of a phase shifting circuit involves the requirement that it be continually supplied from the source, and since continuous supply of the ignition current from the source may deleteriously affect the ignition electrodes, a problem is raised in the use of the phase shift network. In accordance with my invention, the control or ignition transformer is provided with a short circuiting winding which is connected directly across the anode-cathode paths of the valves. The winding is short circuited when the valves are conductive and the current flow through the ignition electrodes is decreased during the conductive intervals. Where the ignition angle may be large or the short-circuiting winding does not suffice to maintain the ignition electrode at the desired low temperature for any other reason, artificial cooling of the ignition electrode is provided in accordance with my invention.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1:
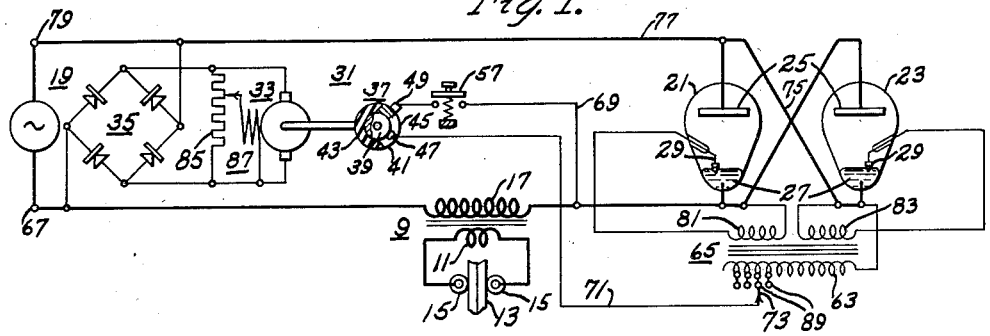
Figure 1 is a diagrammatic view showing an embodiment of my invention.

The apparatus shown in Fig. 1 is a resistance seam welding system comprising a welding transformer 9 from the secondary 11 of which current impulses are supplied to a material 13 to be welded through a pair of welding electrodes 15. The primary 17 of the welding transformer is connected to a suitable source 19 of alternating current, which may be an ordinary commercial 60-cycle source, through a pair of electric discharge valves 21 and 23 of the immersed ignition electrode type. Each of the valves has an anode 25 composed of nickel, carbon or other suitable material, a cathode 27 consisting of a pool of mercury or like material, and an ignition electrode 29 composed preferably of boron carbide but in certain cases also of silicon carbide or other materials. The valves 21 and 23 are connected between the source 19 and the load 9—13 in anti-parallel.

In seam welding apparatus, the current is supplied in the form of discrete impulses; each impulse consists of a train of sub-impulses, one sub-impulse flowing during each half period of the source. To measure out the welding current impulses, a timing system 31 comprising a direct current motor 33 which is supplied from the source 19 through a rectifier 35 and which drives a commutator 37 is provided. The commutator 37 is provided with an inner completely conducting ring 39 and an outer ring 41 in metallic engagement with the inner ring. The outer ring 41 has an insulating segment 43 extending over a portion of its periphery and a conducting segment 45 extending over the remainder. Brushes 47 and 49 engage the inner and outer rings 43 and 45, respectively and are, in turn, connected in a circuit including a suitable circuit closing element 57 which may be a foot switch, a push button, or the like.

When power is supplied to the system and the switch 57 is closed and deenergized a circuit through the primary 63 of an ignition transformer 65 is closed and opened with a periodicity dependent on the speed of rotation of the commutator 37 and for intervals, depending on the relative lengths of the conducting and insulating segments. The circuit extends from the lower terminal 67 of the source 19 through the primary 17 of the welding transformer 9, a conductor 69, the switch 57, the conducting segment 45 of the commutator 37, a conductor 71, the adjustable tap 73 of the primary 63 of the ignition transformer 65, the selected turns of the primary 63, a conductor 75, a conductor 77, to the upper terminal 79 of the supply source.

The primary 63 of the ignition transformer 65 is thus connected across the electric discharge valves 21 and 23 and when the latter are not carrying current, the potential of the source is impressed between its terminals. The transformer 65 is provided with a pair of secondaries 81 and 83, the former 81 being directly connected between the ignition electrode 29 and the cathode 27 of the discharge valve 21 and the latter 83 being directly connected between the corresponding electrodes of the other valve 23. Accordingly, when the ignition transformer 65 is energized by the source, a potential is impressed across the ignition electrodes 29 of the valves 21 and 23. For a predetermined polarity of the source potential, one or the other of the ignition electrodes 29 is supplied with a positive half-wave of potential at the same time that positive anode-cathode potential is impressed on its valve 21 or 23. The ohmic resistance of the ignition electrode is large as compared to the reactive impedance in the ignition circuits and therefore the anode-cathode potential and the potential impressed on the ignition electrode may be assumed to be in phase. When during any positive half-cycle the potential across one ignition electrode 29 rises to a sufficiently high value, the corresponding valve is rendered conductive. After the valve becomes conductive, the potential across the primary 63 of the control transformer 65 is reduced to the arc drop value, which is of the order of 10 to 20 volts and, therefore, the flow of substantial current through the ignition electrode is interrupted. As the source potential varies in polarity, the valves 21 and 23 are alternately rendered conductive and alternating current pulses are supplied to the material to be welded in rhythm with the half-cycles of the source.

Impulses made up of trains of half-cycle sub-impulses are thus supplied for intervals of time determined by the length and the speed of rotation of conducting segment 45 of the commutator 37. The number of sub-impulses which make up an impulse and therefore the time of supply of each welding impulse or the number of welds per unit time, may be varied or regulated by controlling the speed of the motor 33. The latter object is accomplished in a simple manner by varying the resistance 85 in the field circuit 87 of the motor. The time between impulses is, of course, dependent on the length and speed of the insulating segment 43. The ratio of the welding time to the pause may be varied by varying the relative lengths of the conducting and insulating segments 45 and 43. The measuring out of a predetermined number of sub-impulses to make up a welding impulse is known in the art as the timing of the supply of welding current. In addition to the timing, another desideratum in welding is heat control, i. e., the control of the heating of the material to be welded during the welding operation.

The heat supplied by the welding current is dependent on the magnitude of the welding current which flows and therefore on the magnitude of the sub-impulses. In the present case, the magnitude of the sub-impulses is dependent on the angle in the half-cycles of the source at which the sub-impulses current flow is initiated and this angle, in turn, is simply the ignition angle. To control the heat supplied during welding, therefore, the ignition angle is controlled. This object may be accomplished by setting the amplitude of the ignition potential at the desired values; that is to say, by engaging the movable tap 73 with the proper fixed tap 89 of the ignition transformer secondary 63.

I have found that if an ignition electrode 29 is continuously, or for relatively long time intervals, supplied with current, it may become deteriorated by reason of the heat developed by the flow of current. In the embodiment of my invention disclosed in Fig. 1, this undesirable feature is eliminated by the connection of the primary 63 of the ignition transformer 65 in such manner that its potential is reduced to the arc drop value when the load is rendered conductive.

It is to be noted that in view of the fact that the ignition potential and the anode-cathode potential of the valves 21 and 23 are in phase with each other, the ignition angle in the Fig. 1 arrangement cannot be greater than 90°. The 90° point in the potential wave is the point of maximum potential and at this point, the potential across the ignition electrode and the anode-cathode potential are both simultaneously at a maximum. While this limitation is relatively unimportant where the power factor angle is of small magnitude, say less than 20°, difficulties are involved in obtaining the desired range of variation in the heat control for relatively poor power factor loads. For example, for a power factor angle of 80°, the range of variation is only 10°.

Figure 2:
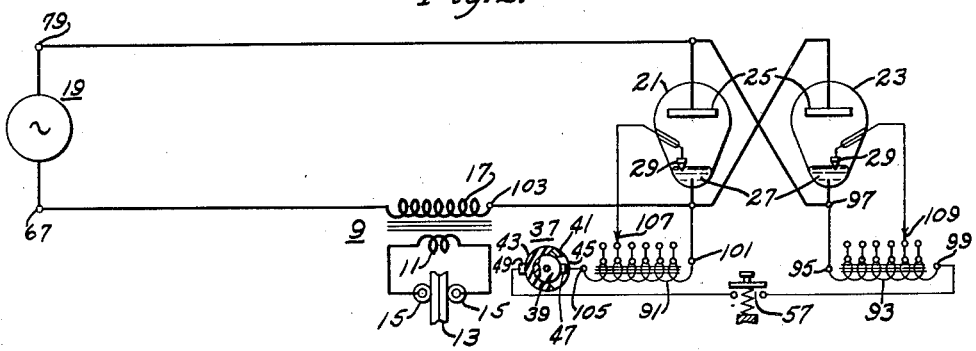
Figure 2 is a diagrammatic view showing a modification of my invention.

In the modification disclosed in Fig. 2, the ignition transformer 65 is replaced by a voltage divider consisting of a pair of variable reactors 91 and 93, One of the reactors 93 is connected at one of its terminals 95 to the common junction point 97 of the terminal 79 of the source 19 and the cathode 27 of one of the valves 23, and at its other terminal 99 to one of the fixed contacts of the switch 57. The other reactor 91 is connected at one terminal 101 to the common junction point of the terminal 103 of the primary 17 of the welding transformer 9 that is remote from the source 19 and the other cathode 27 and at its other terminal 105 to the remaining fixed contact of the switch 57. The movable taps 107 and 109 of the reactors 91 and 93, respectively, are connected each to an ignition electrode 29 of valves 21 and 23, respectively. When the push button 57 is closed potentials predetermined by the setting of the adjustable contacts 107 and 109 of the voltage divider 91—93 are impressed across the ignition electrodes 29 and the valves are rendered conductive at instants in the half periods of the source 19 predetermined by the settings. In this case also, the ignition potential is substantially in phase with the anode-cathode potential and the total range of variation of the phase of the ignition of the valves is from the power factor angle to the 90° point.

Figure 3:
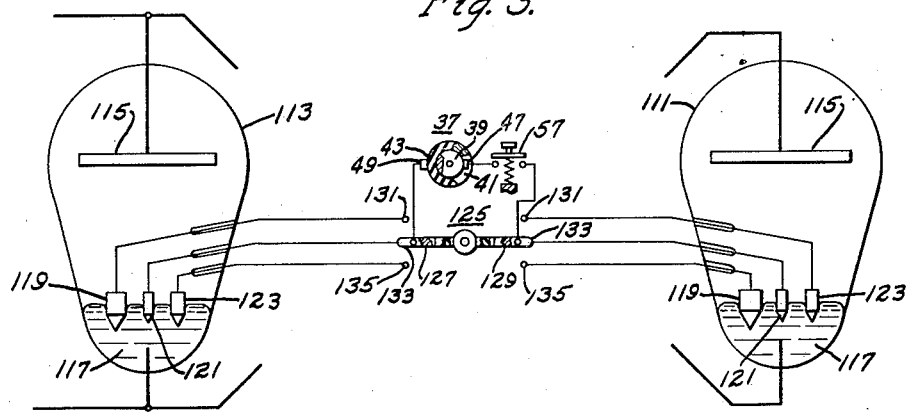
Fig. 3 is a diagrammatic view showing an additional modification of my invention in which discharge valves incorporating a plurality of ignition electrodes are used.

In the Fig. 3 modification, the valves in the other embodiments are replaced by valves 111 and 113 particularly adapted for the practice of my invention. Each of the latter valves comprises an anode 115 and a cathode 117 of the same type as the corresponding elements 25 and 27 in the valves 21 and 23 used in the above-described embodiments. However, in lieu of a single ignition electrode 29, the valves 111 and 113 have a plurality of ignition electrodes 119, 121 and 123, each of which requires a different potential for ignition. This object may be accomplished by using ignition electrodes of different material or different physical construction. Specifically, the ignition electrodes 119, 121 and 123 are shown as composed of the same material, but having different dimensions.

The instant ignition in the half cycles of the source of the valves may be set at six different values by the proper interconnection of the ignition electrodes 119, 121 and 123 of the different valves 113 and 115 in pairs. For this purpose, a selector switch 125 provided with insulated relatively movable contact arms 127 and 129 is utilized. The arms 127 and 129 of the switch 125 may be interconnected by the push button 57. They may, moreover, be connected selectively to fixed contacts 131, 133 and 135, in turn connected to the individual ignition electrodes 119, 121 and 123, respectively. For any desired operation, the selector switch 125 is set so as to interconnect the individual ignition electrodes 119, 121 and 123 of the two valves 113 and 115 that are found desirable and then the operator closes the manual switch 57. It is to be noted that with the Fig. 3 arrangement not only is current flow, in which the positive and negative impulses are equal, attainable, but unsymmetric current flow may also be attained, if desired. For the former condition, like numbered ignition electrodes are interconnected, and for the latter, unlike numbered electrodes are connected.

In accordance with the embodiment of my invention shown in Fig. 3, only six discrete settings of the ignition angle is possible. Of course, the number of settings may be increased by increasing the number of ignition electrodes 119, 121 and 123. However, in any event, continuous variation is not attainable.

Figure 4:
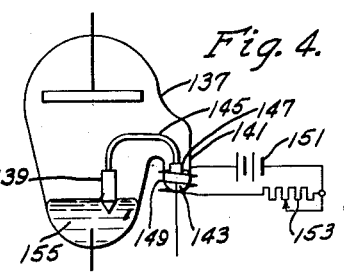
Fig. 4 is a diagrammatic view showing a valve in which the ignition electrode has variable conductivity.

In Fig. 4, a valve 137 of the immersed ignition electrode type, with which continuous variation of the ignition angle is possible, is disclosed. In this structure, the impedance through the ignition electrode 139 and the cathode 155 is varied continuously by varying the volume of the portion of the electrode immersed in the cathode. For this purpose, the discharge valve 137 is provided with a side arm 141 in which a small pool 143 of mercury is disposed. A rigid wire 145 is secured to the ignition electrode 139 and extends into the side arm 141. At its free end, the wire carries a block 147 of magnetic material which dips into the mercury 143. The connection to the ignition electrode may take place through the mercury 145 in the side arm 141, the block 147 of magnetic material and the stiff wire 145. Around the side arm, a suitable solenoid 149 is disposed.

The solenoid is connected in circuit with a source 151 and a rheostat 153 and its magnetic field is set by adjusting the rheostat. As the intensity of the field varies, the extent to which the ignition electrode 139 dips into the mercury cathode 155 is varied and the impedance through the ignition electrode 139 and cathode 155 is correspondingly varied. Since the magnitude of ignition potential varies with the impedance through the ignition electrode and cathode, the instants in the half periods of the source at which a valve 137 of the type disclosed in Fig. 4 is rendered conductive may be set by the proper adjustment of the rheostat 153.

Figure 5:
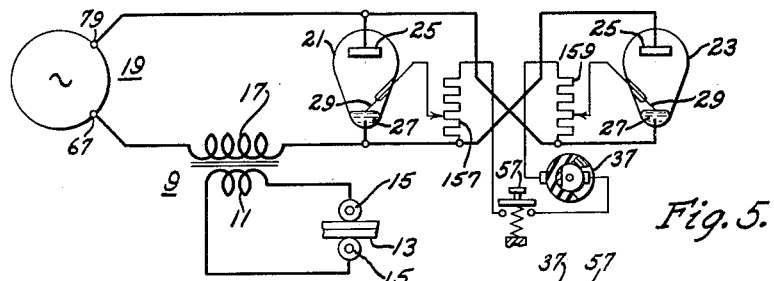
Fig. 5 is a diagrammatic view showing a further modification of my invention.

The Fig. 5 modification is similar to the Fig. 2 modification except that the voltage divider consists of a pair of resistance elements 157 and 159 rather than a pair of reactance elements 91 and 93. The latter arrangement has the advantage that whatever phase displacement between the source potential and the potential impressed across the ignition electrodes may be introduced by reactors such as 91 and 93 is entirely eliminated.

Figure 6:
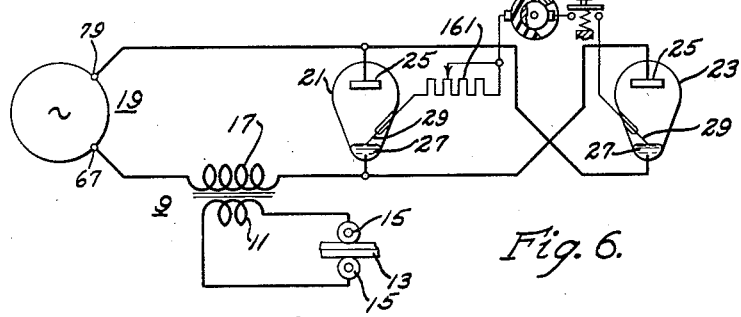
Fig. 6 is a diagrammatic view showing still another modification of my invention.

In the Fig. 6 modification, the ignition electrodes are interconnected through a rheostat 161 when the push button 57 is closed. By reason of this interconnection, the ignition electrodes 29 are connected across the source through the rheostat 161 when the valves are non-conductive. The potential drop across the ignition electrodes 29 is dependent on the setting of the rheostat. For a predetermined setting of the rheostat, the potential impressed across the ignition electrodes 29 rises to the ignition value at a predetermined point in the half periods of the source. By the operation of the rheostat 161, therefore, the point of ignition in the half periods of the source may be set at will.

Since, in the modifications disclosed in Figs. 3 to 6, the ignition potential is in phase with the source potential, the range of variation in these modifications is limited in the same manner as in the modifications disclosed in Figs. 1 and 2 and extends only from the power factor angle to the 90° point. To extend the range of variation of the ignition angle, the phase of the ignition potential must be shifted relative to the potential of the source. This object is accomplished in the arrangement disclosed in Fig. 7.

In this arrangement, a phase shifter 163 of usual structure comprising a reactor 165 and a variable resistor 167 in series with each other, is connected directly across the secondary 169 of an auxiliary transformer 171 supplied directly from the source 19. The primary 173 of an ignition transformer 175 is connected between the intermediate tap 177 of the secondary 169 of the auxiliary transformer 171 and the junction point 179 of the resistor 167 and the reactor 165 of the phase shift network 163 through a resistor 180. The ignition transformer 175 is provided with a pair of secondaries 181 and 183, each of which is connected in circuit with an ignition electrode 29 and a cathode 27 of one of the valves 21 and 23, respectively.

Since the phase shift circuit 163 is continuously supplied with the source potential as long as the main switch for the apparatus (not shown) and the timing relay contactor 59 remain closed, the ignition electrodes 29 are heated substantially by the current flow therethrough and the heat developed may cause them to become deteriorated. To reduce the extent of the heating, the control transformer is provided with a short circuiting winding 185 which is directly connected across the valves 21 and 23. When welding current is supplied, the latter winding 185 is substantially short circuited and the current flow through the ignition electrodes 24 and the secondaries 181 and 183 of the control transformer 175 is substantially reduced.

Figure 7:
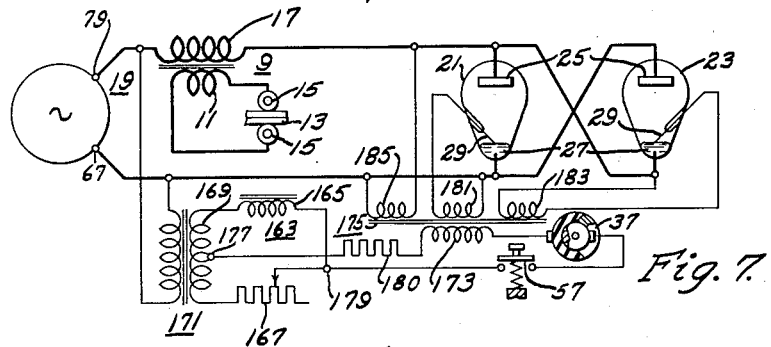
Fig. 7 is a diagrammatic view showing a still further modification of my invention.

It is to be noted that while the short circuiting winding is disclosed as utilized specifically with the modification shown in Fig. 7, it may also be used with other modifications. For example, the transformer 65 in the Fig. 1 arrangement may be provided with a short circuiting winding and may be directly connected across the source 19 in lieu of being connected in parallel with the valves. Moreover, in lieu of the valves 21 and 23, the valves 113, 115 or 137 may be used in the systems disclosed in Figs. 1, 2, 5, 6 and 7.

In certain applications of my invention, it may happen that the short circuiting winding 185 does not provide sufficient interruption in the flow of ignition current to prevent the ignition electrodes from being deteriorated, or it may happen that the use of the short circuiting winding is, for one reason or the other, undesirable. The short circuiting winding 85 may, for example, not suffice to protect the ignition electrodes in situations in which the current flow through the load is initiated relatively late in the half periods of the source. Under such circumstances, the ignition current flows for a relatively long period of the half period of the source 19 at full value and is only reduced by the short circuiting winding during the relatively short interval when the load current flows. The heating produced by the flow of ignition current preceding the instant at which the valves are rendered conductive may prove deleterious to the ignition electrodes 29.

Figure 8:
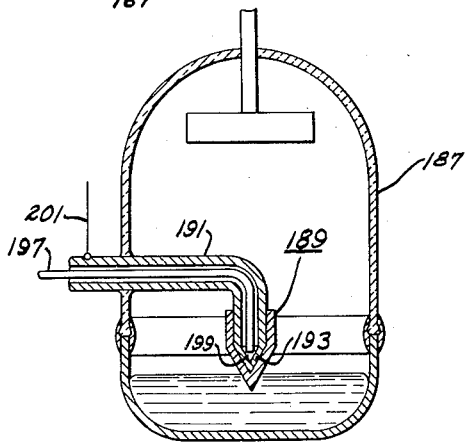
Fig. 8 is a diagrammatic view showing a valve of the immersed ignition electrode type particularly adaptable for use in a system in which the ignition electrode is supplied continuously or for relatively long intervals of time.

To remedy this situation, I provide, in accordance with my invention, a discharge valve 187 of the immersed ignition electrode type with an artificially cooled ignition electrode 189, such as is shown in Fig. 8. In the valve 189, the ignition electrode 187 is of hollow structure. A metallic tube 191 of L-section extends into the hollow portion of the ignition electrode 189 and is in vacuum-tight engagement with the internal wall thereof. The end of the tube 191, which projects into the electrode 189, is a closed one 193, closely fitting the hollow conical opening in the electrode. The tube 191 should preferably be composed of stainless steel. In the assembly of the structure, the end 193 of the tube is given the desired conical configuration, and the electrode 189 is molded around the conical end.

Within the tube 191, a second tube 197 of smaller diameter is provided. The latter tube is also of L-section and projects into the hollow cone 199 formed within the conical portion 193 of the larger tube. The concentric tubes extend through the wall of the discharge valve 187 and are sealed thereto vacuum-tight. A cooling fluid, such as water, may be projected through the inner tube 197 to the hollow region of the ignition electrode and may leave through the outer tube 189. The connecting conductor 201 for the ignition electrode 199 may be secured to the outer tube 189.

It is to be noted that while the ignition electrode should, in accordance with my invention, preferably be cooled in the manner disclosed in Fig. 8, it may also be cooled sufficiently for the purpose for which the valve is used by providing cooling coils within the cathode pool which are in intimate engagement with the ignition electrode or by properly cooling the cathode pool itself.

It is to be noted further that while my invention has been disclosed herein as applied in a seam welding system, it has general applicability and may be used wherever the supply of power to a load is to be controlled. In particular, it may be used with advantage in a spot welding system such, for example, as is shown in the above-mentioned application to me and Staggs.

Further in the modifications, it is to be noted that while in the preferred practice of my invention two distinct discharge valves are connected in anti-parallel to pass alternating current, the use of a single tube having two mercury pool cathodes with an ignition electrode immersed in each and no anodes is understood to be within the scope of my invention. When I use the expression "in effect," a pair of valves hereinafter, I mean thereby both the two-valve arrangement as disclosed and the single-tube arrangement just described.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. For use in supplying current from a source periodically pulsating potential to a load the combination comprising an ignitron having a plurality of principal electrodes and an igniter immersed in one of said electrodes, interposed between said source and said load, means for deriving a potential from said source that is displaced in phase by an angle predeterminable at will with reference to the source potential and which, during each of the periods of said source, has a maximum rate of increase with respect to time that is of the same order of magnitude as that of a hypothetical potential having the same wave form as that of said source, means for impressing said derived potential across said igniter to render said device conductive at instants in the periods of said source that are predeterminable at will and means for reducing the potential impressed across said igniter in response to the flow of current through said load.

2. For use in supplying current from a source of periodically pulsating potential to a load the combination comprising an ignitron having a plurality of principal electrodes and an igniter immersed in one of said electrodes interposed between said source and said load, means for deriving a potential from said source that is displaced in phase by an angle predeterminable at will with reference to the source potential and which, during each of the periods of said source, has a maximum rate of increase with respect to time that is of the same order of magnitude as that of a hypothetical potential having the same wave form as that of said source, means for impressing said derived potential across said igniter to render said device conductive at instants in the periods of said source that are predeterminable at will, means for reducing the potential impressed across said igniter in response to the flow of current through said load, and means for preventing the igniter from becoming deteriorated by reason of continuous current flow therethrough.

3. For use in supplying current from a source of periodically pulsating potential to a load the combination comprising an ignitron having a plurality of principal electrodes and an igniter immersed in one of said electrodes interposed between said source and said load, means for deriving a potential from said source that is displaced in phase by an angle predeterminable at will with reference to the source potential and which, during each of the periods of said source, has a maximum rate of increase with respect to time that is of the same order of magnitude as that of a hypothetical potential having the same wave form as that of said source, means for impressing said derived potential across said igniter to render said device conductive at instants in the periods of said source that are predeterminable at will, means for reducing the potential impressed across said igniter in response to the flow of current through said load, and cooling means for said igniter 4. In combination, an electric discharge device of the immersed-ignition-electrode type having a plurality of principal electrodes and a control electrode immersed in one of said principal electrodes, a source of periodically pulsating potential, means for impressing a potential from said source between said principal electrodes, and means including a transformer, energized from said source and having a secondary connected between said ignition electrode and said one principal electrode and an auxiliary winding connected between said principal electrodes, for impressing a potential across said control electrode to render said device conductive at instants in the periods of said source that are predeterminable at will, said potential, during each of the periods of said source, having a maximum rate of increase with respect to time that is of the same order of magnitude as that of a hypothetical potential having the same wave form as that of said source.

5. In combination, an electric discharge device of the immersed-ignition-electrode type having a plurality of principal electrodes and a control electrode immersed in one of said principal electrodes, a source of periodically pulsating potential, means for impressing a potential from said source between said principal electrodes, and means including a transformer energized from said source for impressing a potential across said control electrode to render said device conductive at instants in the periods of said source that are predeterminable at will, said transformer having a winding connected in parallel with said discharge device so that said control electrode carries substantially no current when said device is conductive.

EDWIN H. VEDDER.